(12) United States Patent
Okuno

(10) Patent No.: US 6,621,623 B1
(45) Date of Patent: Sep. 16, 2003

(54) OPTICAL FIBER AMPLIFYING DEVICE STABILIZED FOR TEMPERATURE AND SIGNAL LEVEL

(75) Inventor: Hideki Okuno, Tokyo (JP)

(73) Assignee: NEC Corporation, Tokyo (JP)

( * ) Notice: Subject to any disclaimer, the term of this patent is extended or adjusted under 35 U.S.C. 154(b) by 254 days.

(21) Appl. No.: 09/676,560

(22) Filed: Oct. 2, 2000

(30) Foreign Application Priority Data

Oct. 4, 1999 (JP) .......................................... 11-282611

(51) Int. Cl.$^7$ ............................................. H04B 10/12
(52) U.S. Cl. .............................. 359/341.1; 359/341.41; 359/341.42
(58) Field of Search ......................... 359/341.1, 341.41, 359/341.42, 341.43

(56) References Cited

U.S. PATENT DOCUMENTS

| | | | |
|---|---|---|---|
| 6,104,526 A | 8/2000 | Kakui | |
| 6,313,941 B1 * | 11/2001 | Suzuki et al. | 359/337 |
| 6,320,693 B1 * | 11/2001 | Cereo et al. | 359/337 |
| 6,351,583 B1 * | 2/2002 | Bergmann et al. | 385/24 |

FOREIGN PATENT DOCUMENTS

| | | |
|---|---|---|
| JP | A 4-11794 | 1/1992 |
| JP | 4-011794 | 1/1992 |
| JP | 8-005860 | 1/1996 |
| JP | 9-246638 | 9/1997 |
| JP | A 9-246638 | 9/1997 |
| JP | A 2000-91674 | 3/2000 |
| JP | A 2000-91675 | 3/2000 |
| JP | A 2000-277842 | 10/2000 |
| JP | A 2001-7428 | 1/2001 |

* cited by examiner

*Primary Examiner*—Ricky Mack
*Assistant Examiner*—Alicia M Harrington
(74) *Attorney, Agent, or Firm*—Young & Thompson

(57) ABSTRACT

An optical fiber amplifying apparatus is provided with an optical fiber for amplifying input signal lights, a heating/cooling element for heating or cooling the optical fiber, and a temperature control circuit for controlling the element. The circuit effects control so as to keep the optical fiber at a prescribed temperature on the basis of the output of a temperature sensor. The circuit also controls the heating/cooling element so as to keep the level(s) of at least one signal light extracted out of wavelength-multiplex signal lights at a prescribed value. The circuit can compute the gain from the input and output levels of one or more signal lights, and control the element so as to keep this gain within a prescribed range.

25 Claims, 15 Drawing Sheets

OPTICAL FIBER AMPLIFYING DEVICE STABILIZED FOR TEMPERATURE AND SIGNAL LEVEL

BACKGROUND OF THE INVENTION

1. Field of the Invention

The present invention relates to an optical fiber amplifying apparatus, and more particularly to an optical fiber amplifying apparatus capable of operating stably against variations in device temperature or in signal light level.

2. Description of the Related Prior Art

In a wavelength-multiplex optical transmission system, it is possible to expand the transmission capacity of a single optical fiber transmission path by multiplexing signal lights of a plurality of wavelengths. When the number of signal lights is increased, it becomes necessary for the optical fiber amplifier applied to this system to be flat in the wavelength-dependence of the gain in a wide range of wavelengths. Generally, optical fiber amplifiers applied to a wavelength-multiplex optical transmission system uses a 1550-nm band, commonly known as the C band, and a 1580-nm band, known as the L band, in both of which the wavelength characteristic of the gain is flat in a wide range of wavelengths. However, an optical fiber amplifier using an erbium-doped optical fiber (EDF) as the amplifying optical fiber involves the problem that the gain/wavelength characteristic of the EDF in the L band is heavily dependent on temperature. As a consequence, temperature fluctuations in the environment in which such an optical fiber amplifier is installed invite variations in the gain/wavelength characteristic of the optical fiber amplifier. For instance, even if the output level of each of the wavelength multiplex signal lights after amplification is substantially the same and flat, any fluctuation in temperature around the device may give rise to wavelength-dependence in the gain of the optical fiber amplifier, resulting in differences in output level among the individual signal lights after they are amplified.

SUMMARY OF THE INVENTION

Therefore, an object of the present invention is to provide an optical fiber amplifier for use in wavelength-multiplex optical transmission systems, more particularly an optical fiber amplifier which is susceptible to no variation in the wavelength-dependence of the gain or output level against fluctuations in ambient temperature, signal light level or the like and is capable of stable operation.

An optical fiber amplifying apparatus according to the invention is provided with an optical fiber (EDF) doped with some rare earth for amplifying input signal lights and a temperature control means for controlling the temperature of the optical fiber, and directly amplifies the input signal lights. The temperature control means can be provided with a temperature sensor for detecting the temperature around the optical fiber, a heating/cooling element for heating or cooling the optical fiber, and a temperature control circuit for controlling the heating/cooling element according to the output of the temperature sensor. Instead of the heating/cooling element, an electroconductive film formed over the surface of the optical fiber and a current applying means for flowing an electric current to the electroconductive film can be used.

Another optical fiber amplifier according to the invention is provided with a signal light extracting means for extracting at least one signal light out of the amplified wavelength-multiplex signal lights and a level detecting means for detecting the level of the extracted signal light. In this optical fiber amplifier, the temperature control means is provided with a heating/cooling element for heating or cooling the optical fiber and a temperature control circuit for controlling the heating/cooling element according to the level of the detected signal light. The temperature control circuit controls the heating/cooling element so as to keep the level of the signal light at a prescribed value.

An optical fiber amplifier according to still another aspect of the invention is provided with, in addition to the signal light extracting means, a signal light extracting means, arranged on the input side of the optical fiber, for extracting at least one signal light out of the amplified wavelength-multiplex signal lights and a level detecting means for detecting the level of the signal light extracted from the signal light extracting means. The two signal light extracting means extract signal lights of the same wavelength, and the temperature control circuit controls the heating/cooling element on the basis of the two levels of the extracted signal lights. More specifically, the temperature control circuit computes the gains of the signal lights from the two levels of the signal lights, and controls the heating/cooling element so as to keep the gains at a prescribed value. Where a plurality of signal lights are extracted, the temperature control circuit controls the heating/cooling element so as to equalize the gains of the signal lights.

The optical fiber (EDF) for amplifying the signal lights are arranged to be in close contact with the optical fiber (EDF), a bobbin or a member having a grooved part. The heating/cooling element, which may be a Peltier element for instance, is arranged in contact with the bobbin or the member. The signal light extracting means may be an optical branching unit, consisting of a combination of an optical branching device and an optical filter, a variable-wavelength optical filter, a fiber grating or an arrayed waveguide grating.

Such an optical fiber amplifying apparatus can operate stably against variations in ambient temperature or in input signal light level.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
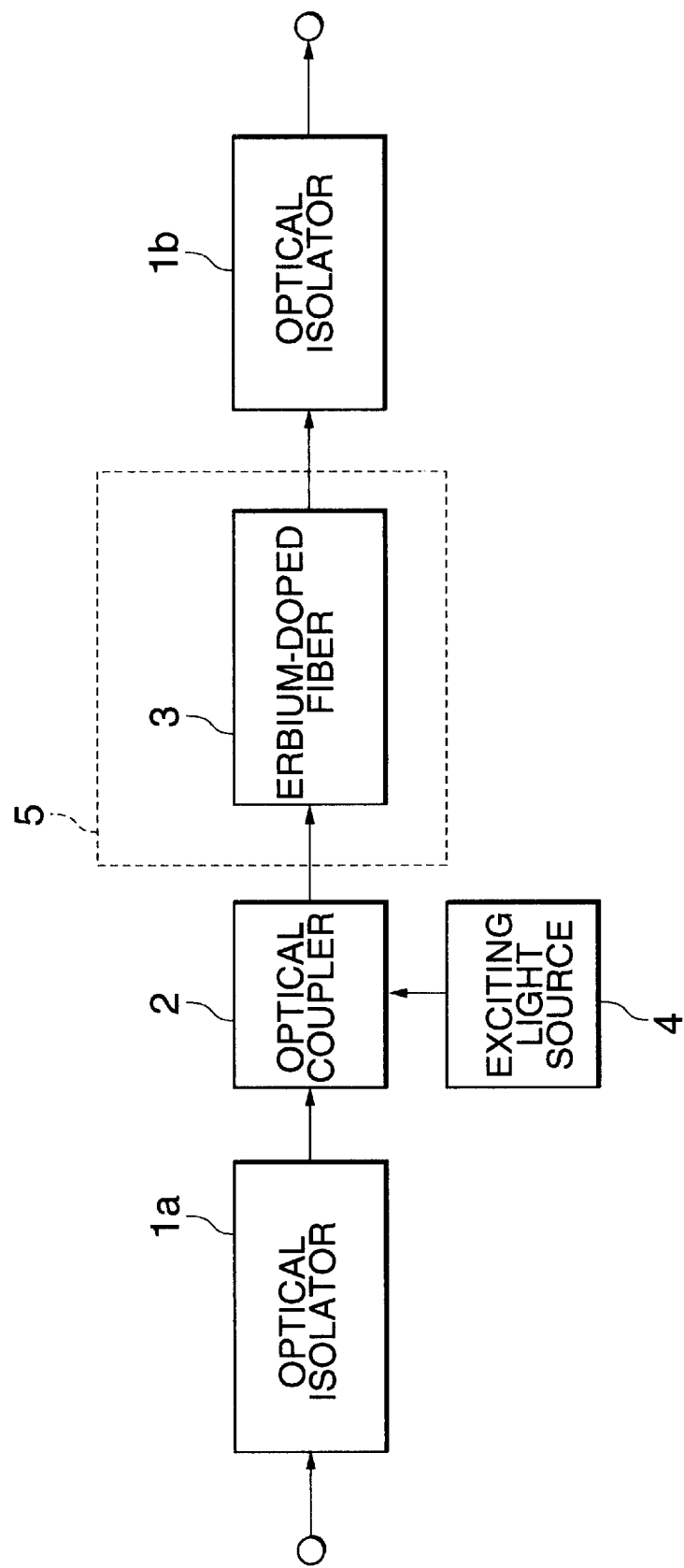
FIG. 1 is a block diagram of an optical fiber amplifier according to the prior art.

Referring to FIG. 1, an optical fiber amplifier for the L band according to the prior art is provided with an EDF module 5 having an erbium-doped optical fiber 3 (EDF), an exciting light source 4 for supplying an exciting light, and an optical coupler 2 for coupling a signal light and the exciting light. To avoid the influence of any reflected return light, optical isolators 1a and 1b are arranged, one each before and after this optical fiber amplifier.

Figure 2:
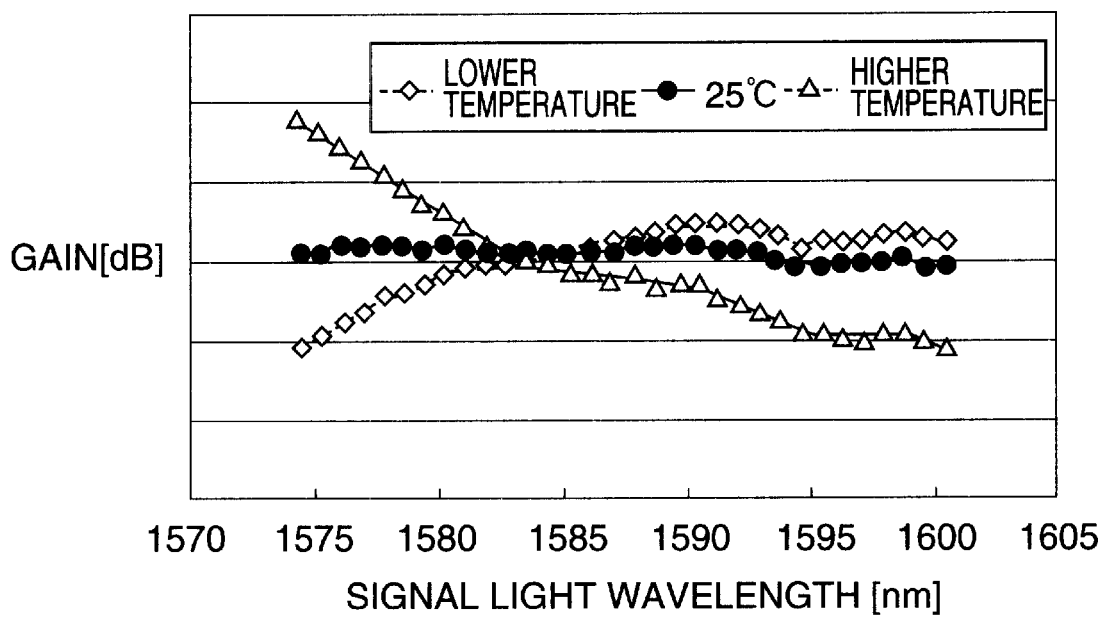
FIG. 2 is a graph showing the relationship between the signal light wavelength and the gain in the optical fiber amplifier according to the prior art.

FIG. 2 is a graph showing the temperature-dependence of the gain/wavelength characteristic of the optical fiber amplifier for the L band according to the prior art. According to this graph, while the gain of the signal light of each wavelength is substantially constant at 25° C., it significantly varies at temperatures of below or above 25° C. As a result, the output level of each signal light after amplification differs from that before amplification in the optical fiber amplifier according to the prior art.

Figure 3A:
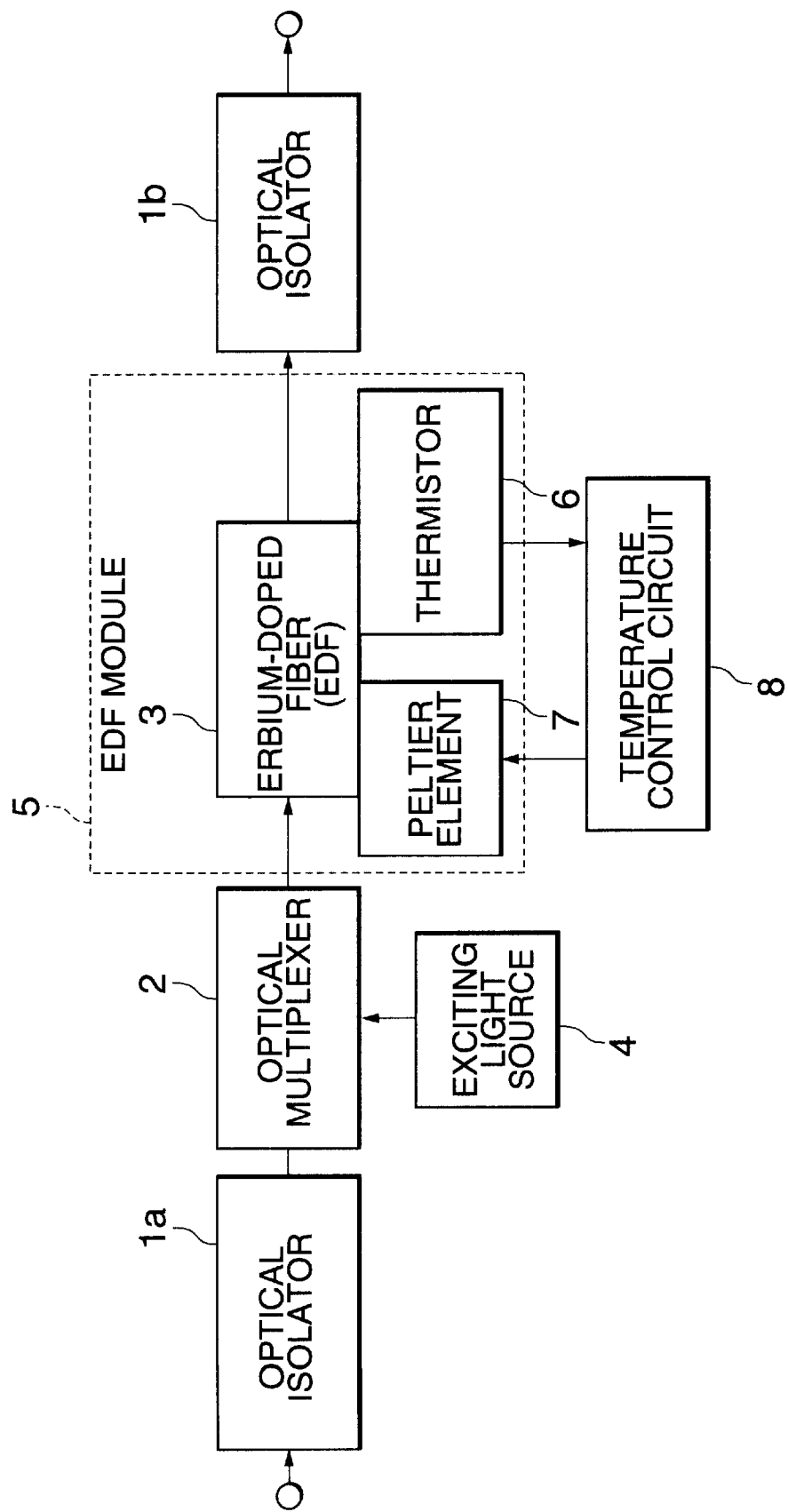
FIGS. 3A, 3B and 3C are block diagrams of an optical fiber amplifying apparatus, which is a first preferred embodiment of the invention.

Referring to FIG. 3A, the optical fiber amplifying apparatus which is the first embodiment of the invention, is provided with an EDF module 5, an exciting light source 4 for supplying an exciting light, an optical wavelength-division multiplexer 2 for introducing the exciting light to the EDF3, and optical isolators 1a and 1b for avoiding the influence of any reflected return light. The EDF module 5 is provided with an EDF 3 for amplifying a signal light of a 1.55-$\mu$m wavelength band, a Peltier element 7 for heating or cooling the EDF 3, and a thermistor 6 (TH) for detecting the temperature around the EDF 3. To the EDF module 5 is connected a temperature control circuit 8 for controlling the temperature of the Peltier element 7 by regulating the current supplied to the element 7 on the basis of the temperature detected by the thermistor 6. The temperature control circuit 8 so controls the Peltier element 7 as to keep the monitored value by the thermistor 6 monitoring the temperature of the EDF 3 at a prescribed value. Therefore the control circuit 8 keeps the temperature EDF 3 constant to prevent the gain/wavelength characteristic of the EDF 3 from being varied by any fluctuation in the ambient temperature. To describe a more specific configuration, a signal light of a 1580-nm band comes incident on the optical wavelength-division multiplexer 2 via the optical isolator 1a. On the other hand, an exciting light of a 1480-nm band comes incident on the optical coupler 2 from a laser diode 4. The optical wavelength-division multiplexer 2 multiplexes these signal light and exciting light, and delivers the multiplexed light to the EDF 3, which amplifies the signal light and outputs it via the optical isolator 1b. Incidentally, the optical wavelength-division multiplexer 2 can be arranged on the output side of the EDF module 5.

Figure 3B:
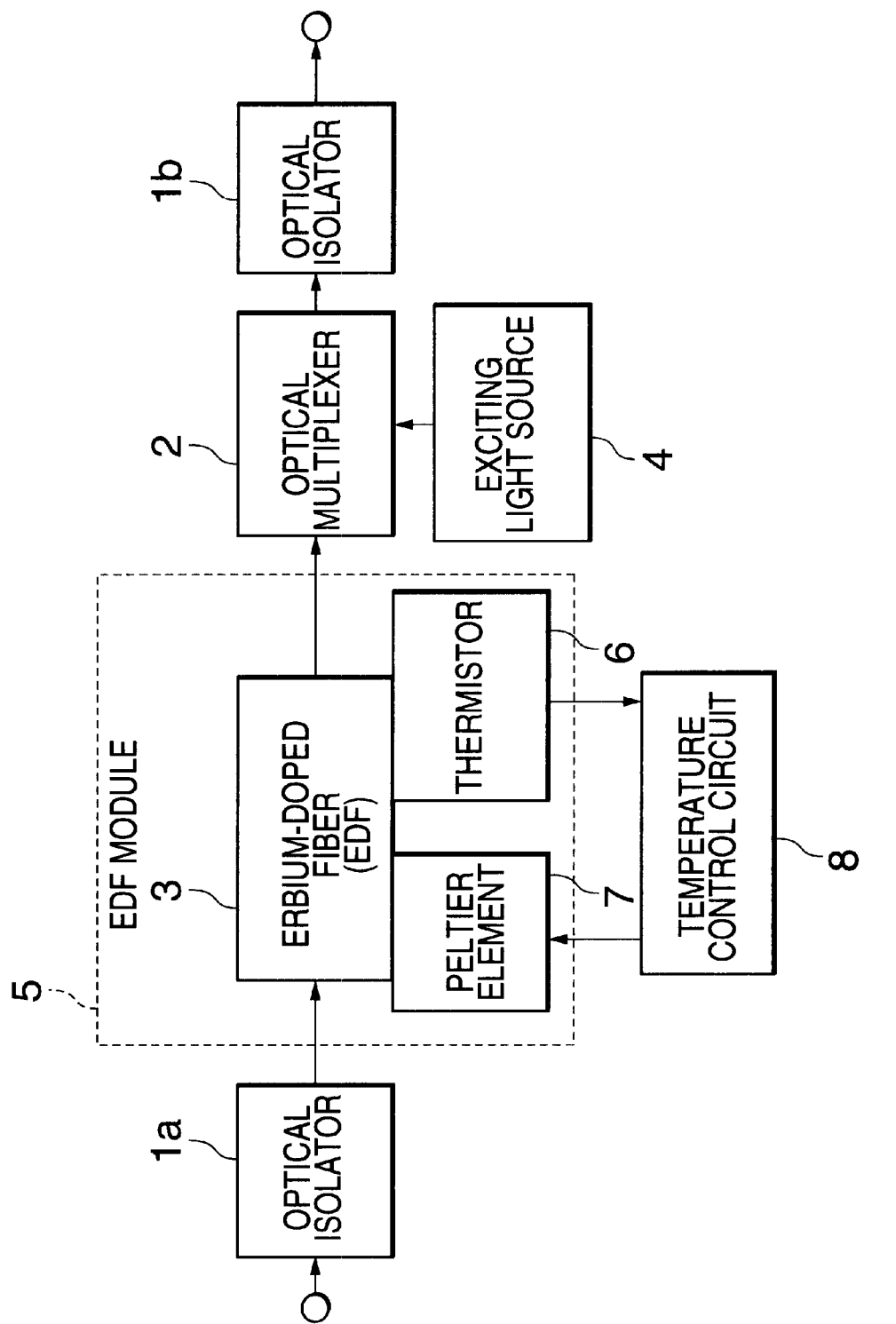

Referring now to FIGS. 3B and C, the exciting light source 4 for supplying the exciting light and the optical wavelength-division multiplexer 2 for introducing the exciting light to the EDF 3 can be arranged either on the output side or the two sides of the EDF module 5.

Figure 4A:
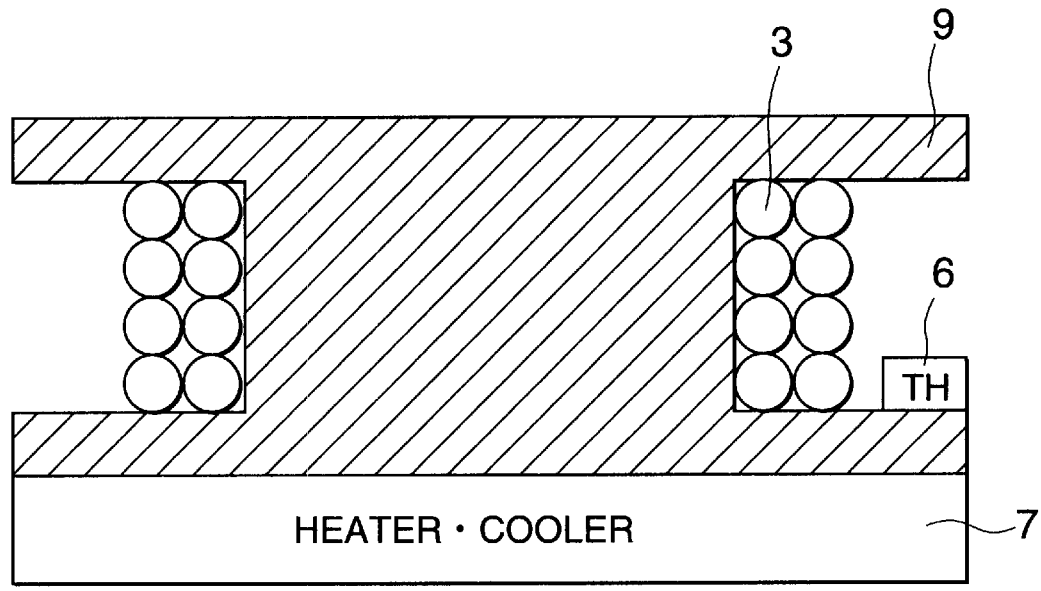
FIGS. 4A and 4B are cross sections illustrating examples of the arrangement of the optical fiber.

Referring to FIG. 4A, in a first specific example of EDF module 5, the EDF 3 is wound around a bobbin 9 built of highly thermo-conductive aluminum, the thermistor 6 is installed on a flange part of the bobbin 9, and the Peltier element 7 is installed in contact with all over the flange of the bobbin 9. Although the EDF 3 is wound doubly around the bobbin 9 in this example, the winding may as well be single, triple or more. A bobbin 9 with no flange can also be used.

Figure 4B:
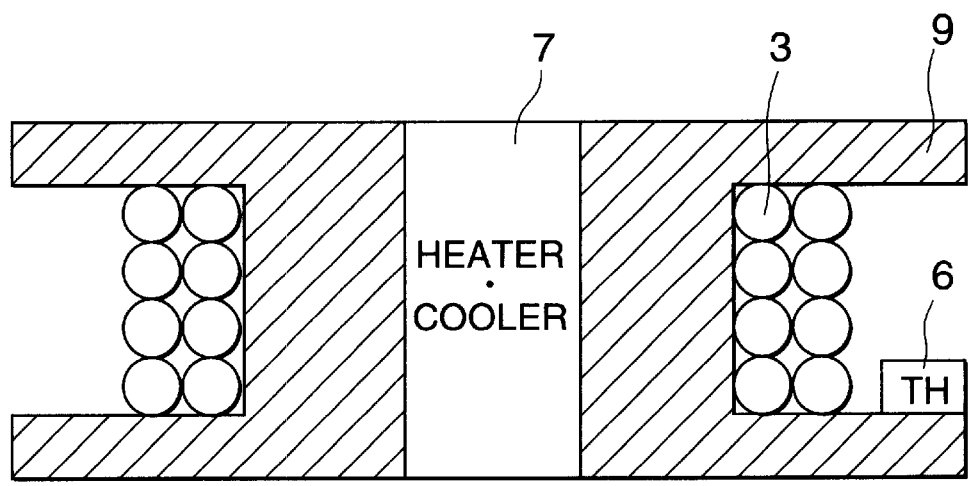

Referring to FIG. 4B, the bobbin 9 is cylindrically shaped, and the Peltier element 7 is installed within the cylindrical bobbin.

Figure 5:
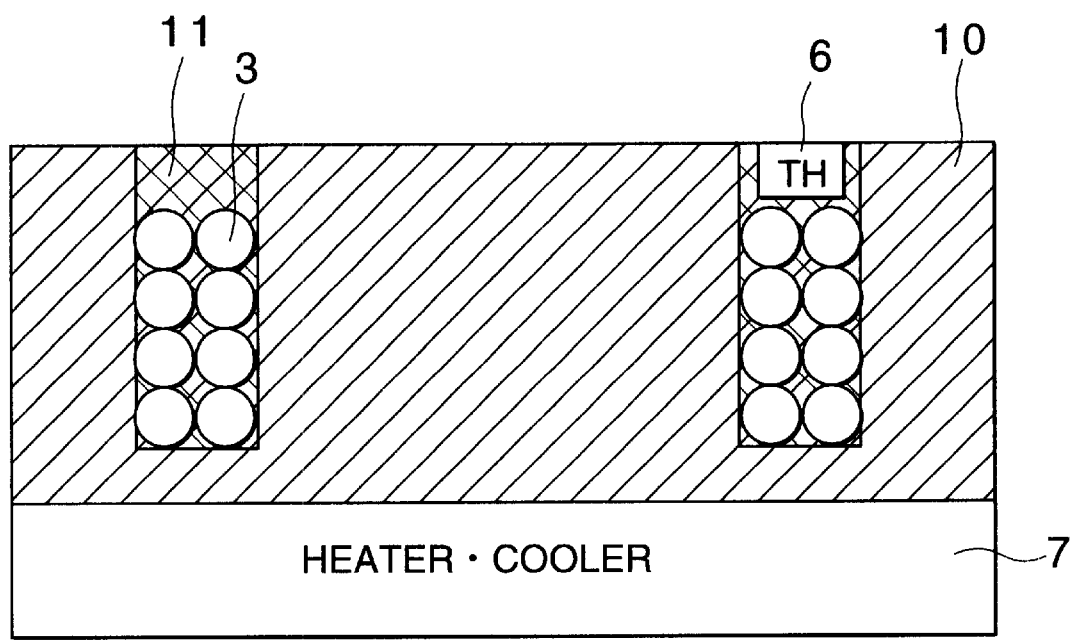
FIG. 5 is a cross section illustrating another example of the arrangement of the optical fiber.

Referring to FIG. 5, in a second specific example of EDF module 5, the EDF 3 is housed in a groove formed in a member 10 built of highly thermo-conductive aluminum, and the inside of the groove is filled with silicon grease 11. The thermistor 6 is mounted in the silicon grease 11 together with the EDF 3, and the Peltier element 7 is installed in contact with a side of this member 10. Since the EDF 3 and the thermistor 6 are mounted in the highly thermo-conductive silicon grease filling the groove in the member 10, the accuracy of temperature monitoring is enhanced. The groove in which the EDF 3 is housed may be, for instance, circular or oval in cross section, and the EDF 3 is wound around a member within this groove. In the EDF module 5 of the above-described specific example, the Peltier element 7 heats or cools the EDF 3 via the bobbin 9 or the member 10. The bobbins in the examples of FIGS. 4A and 4B and the member in the example of FIG. 5 may be built of some other metallic or non-metallic highly thermo-conductive material than aluminum.

Figure 3C:
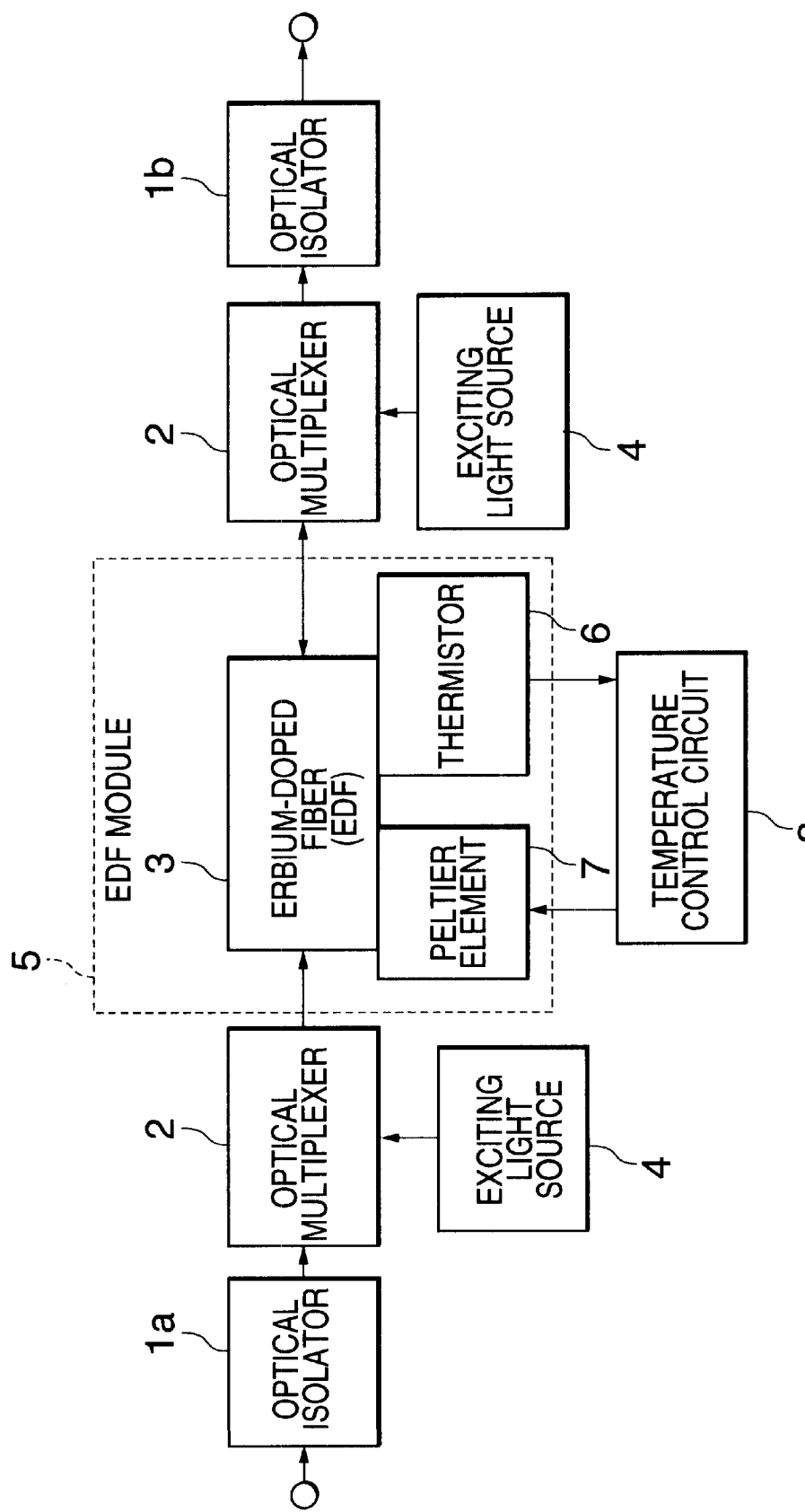
Figure 6:
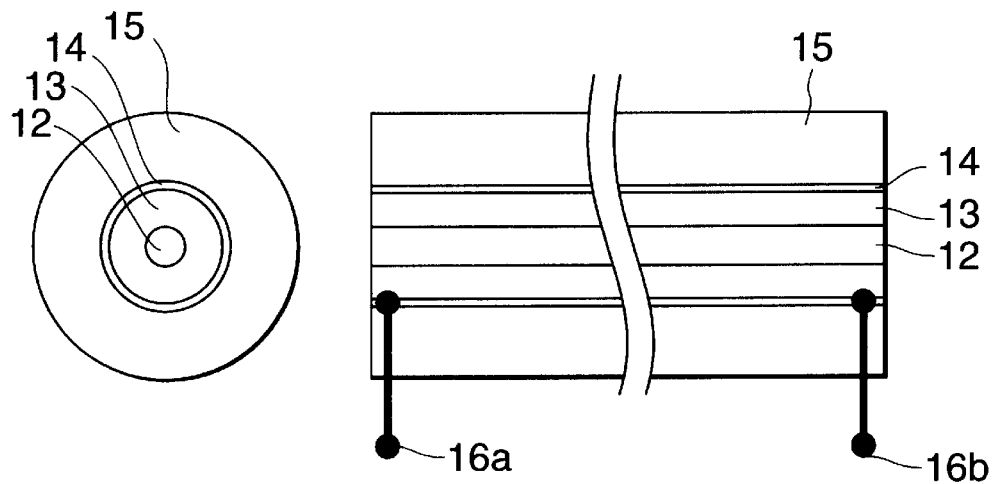
FIG. 6 is a cross section illustrating an example of the structure of the optical fiber.

Referring to FIG. 6, the EDF 3 is provided with an optically transmissive core 12 and clad 13, and a carbon film 14 and acrylate resin 15 for securing a sufficient bending strength. This carbon film 14 is fitted with electrodes 16a and 16b for flowing an electric current to the carbon film. These EDF 3 and thermistor 6 can be housed in the bobbin 9 or a case 10 illustrated in, for example, FIG. 2 or 3. In this third specific example, because Joule heat generated by the carbon film 14 warms the EDF 3 but cannot cool it, it is necessary to set the target of temperature control higher than the upper limit of the ambient temperature range in advance. The EDF 3 is optimized to so as to have the flattest gain/wavelength characteristic at the target level of temperature control. In the foregoing example, the temperature sensor may be a usual thermocouple. A device capable of cooling alone can as well be used instead of a heater/cooler. In place of the carbon film, a thin metallic film or a resistance film may be used as well.

Figure 7:
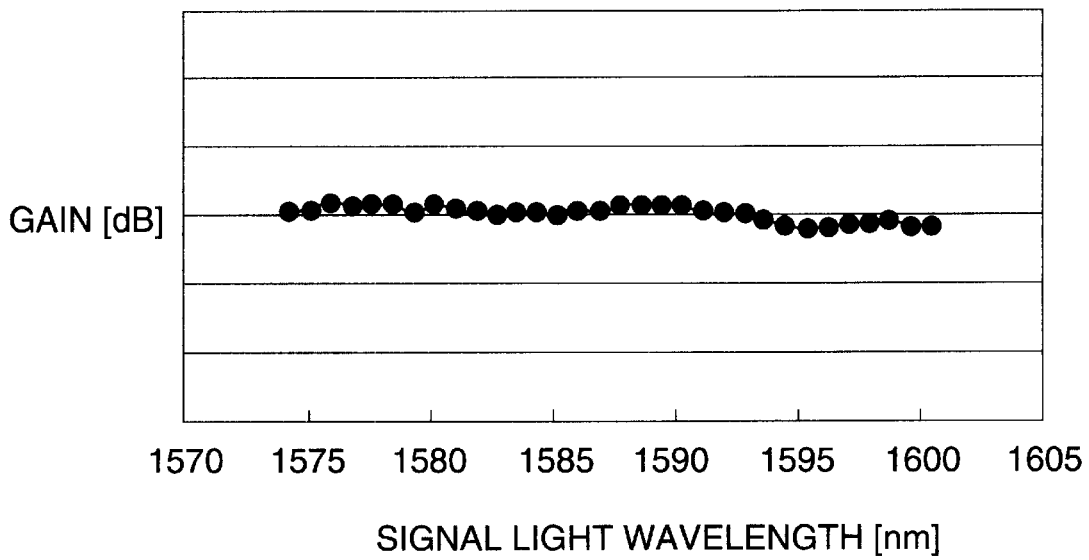
FIG. 7 is a graph showing the relationship between the signal light wavelength and the gain of the optical fiber amplifying apparatus according to the invention.

Referring to FIG. 7, the gain/wavelength characteristic (relationship between wavelength and gain) of the optical fiber amplifying apparatus of any specific example described above is such that, when the temperature of the EDF 3 is around 25° C., the variation range of the gain is about 1 dB in the wavelength range of 1570 nm to 1605 nm. When the ambient temperature is higher than 25° C., the resistance of the thermistor 6 fitted to the EDF module 5 drops. The temperature control circuit 8 detects the higher temperature of the EDF 3 than 25° C., and flows a drive current in the cooling direction to the Peltier element 7 to control the temperature of the EDF 3. When the ambient temperature is lower than 25° C., the resistance of the thermistor 6 fitted to the EDF module 5 rises. Then the temperature control circuit 8 detects the lower temperature of the EDF 3 than 25° C., and flows a drive current in the heating direction to the Peltier element 7 to control the temperature of the EDF 3.

Figure 8:
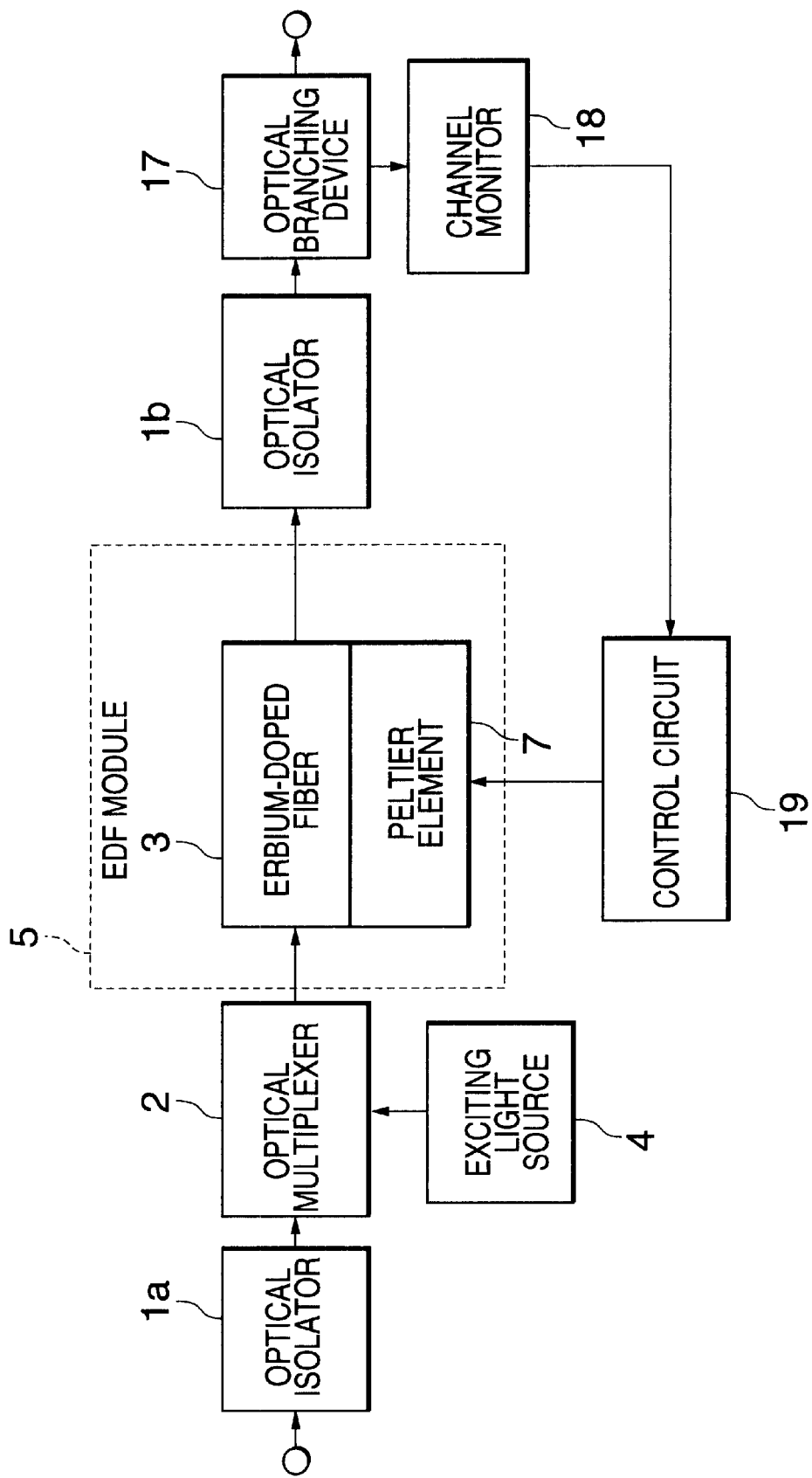
FIG. 8 is a block diagram of an optical fiber amplifying apparatus, which is a second preferred embodiment of the invention.

Referring to FIG. 8, an optical fiber amplifying apparatus, which is a second preferred embodiment of the present invention, particularly intended for wavelength-multiplex signal lights, heats or cools the EDF 3 on the basis of the output level of a specific signal light out of the wavelength-multiplex signal lights. This optical fiber amplifying apparatus is provided with an optical branching device (e.g., optical coupler) 17 for branching part of the wavelength-multiplex signal lights. To the branching port of the branching device is connected a channel monitor 18 for extracting a signal light of a specific wavelength out of the branched wavelength-multiplex signal lights and detecting the output level of the signal light. The channel monitor 18 delivers the output level of the detected signal light to the control circuit 19 as the monitoring signal, The control circuit 19 analyzes the monitoring signal from the channel monitor 18, and controls the Peltier element 7 of the EDF module 5 so as to maximize the flatness of the wavelength characteristic of the output level from the optical fiber amplifying apparatus. The output level of this signal light at the time the wavelength characteristic becomes the flattest, i.e. the output level of the control target, is preset in the control circuit 19. Incidentally, the channel monitor 18, using an optical band pass filter for selectively extracting a signal of a predetermined wavelength (channel) out of the wavelength-multiplex signals, monitors the signal light of the pertinent wavelength. In this and following examples, the EDF module 5 has no thermistor.

Figure 9:
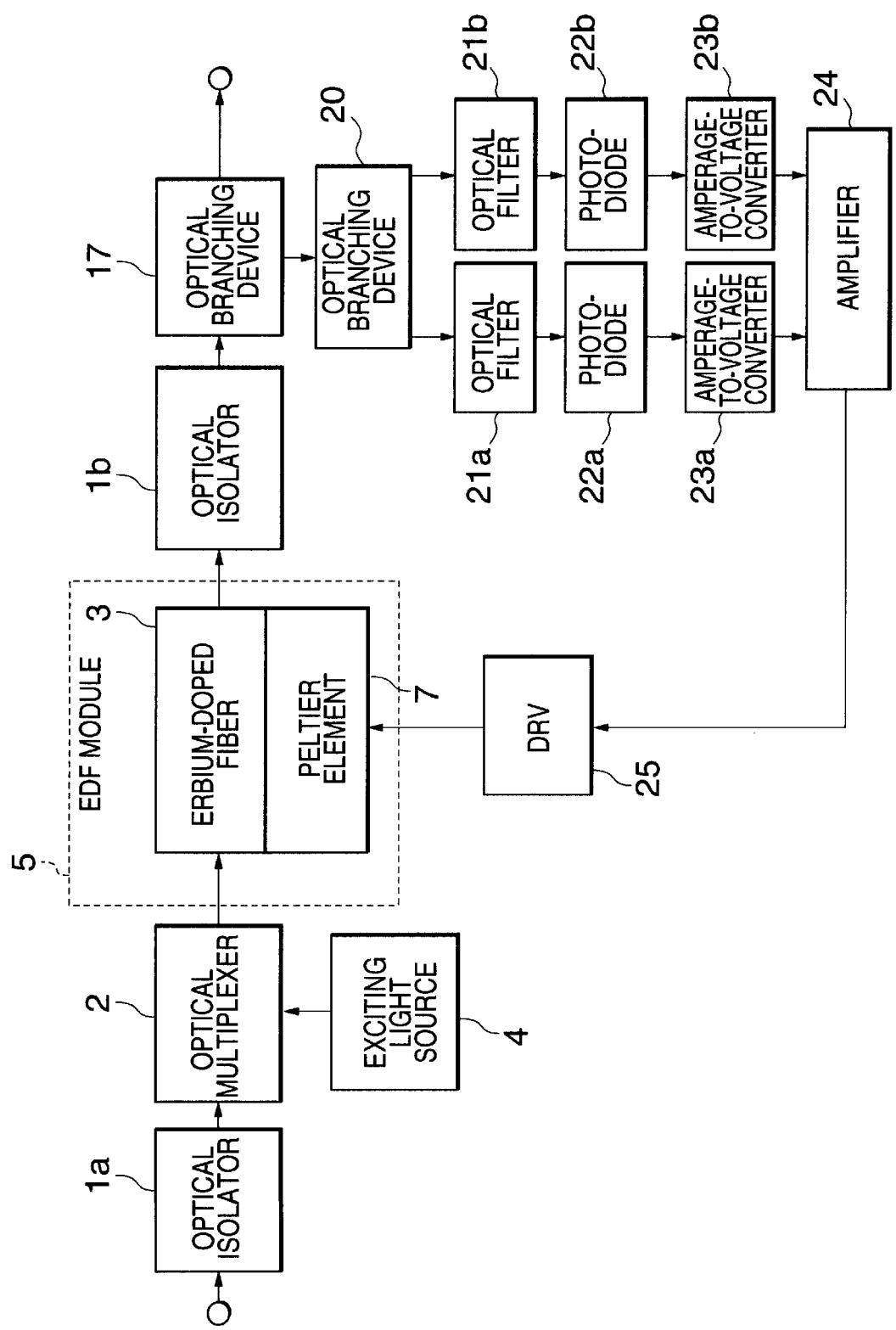
FIG. 9 is a block diagram of an optical fiber amplifying apparatus, which is a third preferred embodiment of the invention.

Referring to FIG. 9, in an optical fiber amplifying apparatus, which is a third preferred embodiment of the invention, a plurality of signal lights contained in amplified wavelength-multiplex signal lights are extracted, and control is so effected that the output level of each signal light contained in these wavelength-multiplex signal lights be kept within a prescribed range. FIG. 9 illustrates a case in which signal lights of two wavelengths (e.g., a signal light of 1580 nm in wavelength and another of 1590 nm in wavelength) are wavelength-multiplexed. This optical fiber amplifying apparatus is provided, following the optical isolator 1b, with an optical branching device 17 for branching part of the amplified wavelength-multiplex signal lights. An optical branching device 20, connected to the optical branching device 17, branches the wavelength-multiplex signal lights into the number of signal slights (two in this embodiment) contained in the wavelength-multiplex signal lights. Optical filters 21a and 21b extract signal lights of respectively specific wavelengths (a wavelength of 1580 nm and a wavelength of 1590 nm). These signal lights are converted into amperages by photodiodes 22a and 22b, respectively, and further converted into voltages by amperage-to-voltage converters 23a and 23b, respectively. An amplifying circuit 24 amplifies the difference between the voltages respectively supplied by the amperage-to-voltage converters 23a and 23b (i.e. the output levels of the signal lights of the two wavelengths), and delivers it to a driver circuit 25. The driver circuit 25 controls the Peltier element 7 to reduce the voltage difference. Since in this third embodiment the level difference between signal lights is directly detected and controlled, the output levels of individual signal lights can be flattened even if the overall input level of the signal lights varies or the output levels are actively varied by altering the gain. Where three or more signal lights are extracted from the wavelength-multiplex signal lights, the driver circuit 25 can control the Peltier element 7 as described above by using the levels of two, three or more specific signal lights (i.e. voltages). The control circuit 25 can effect control so as to keep the levels of the plurality of signal lights within a prescribed range.

Figure 10:
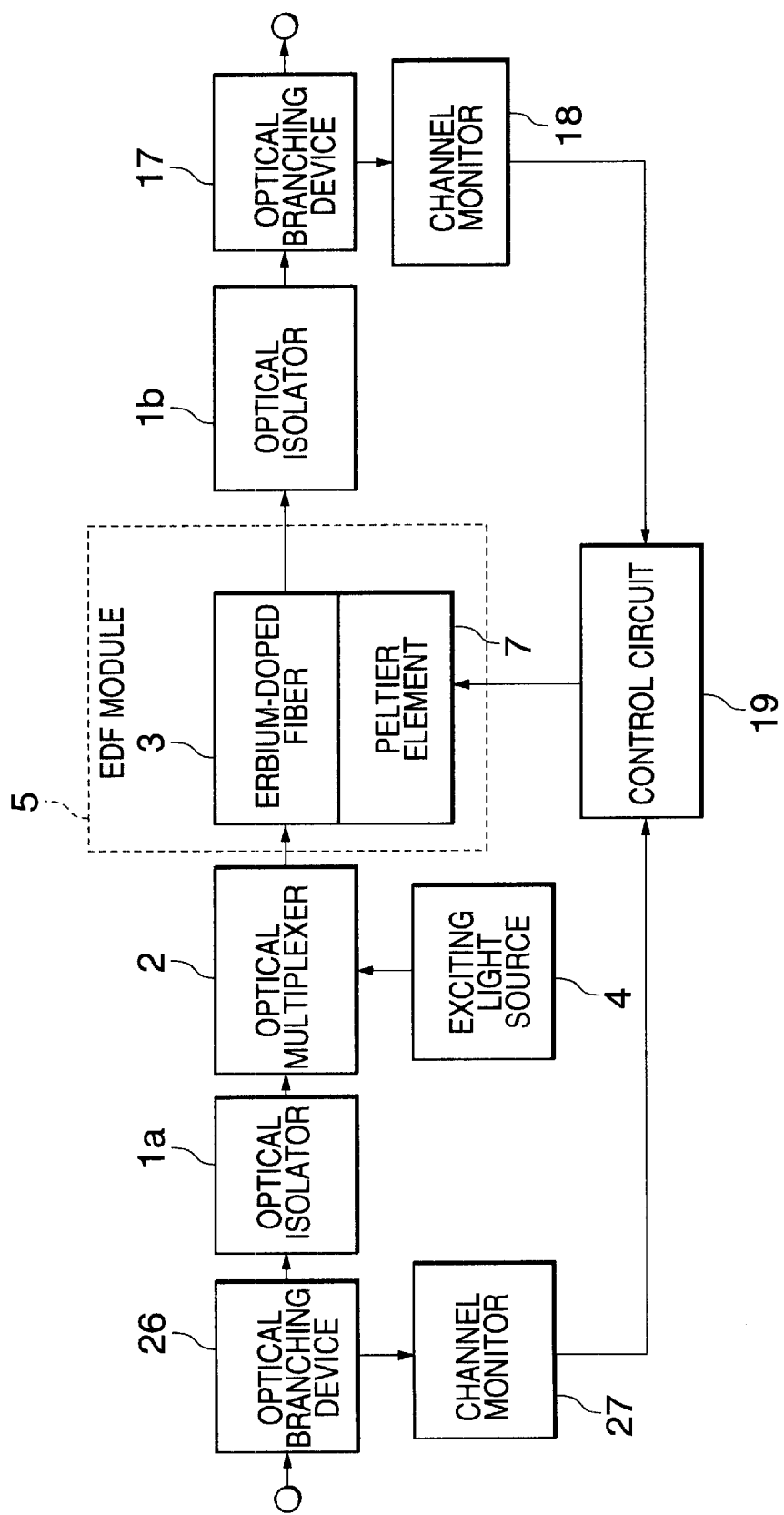
FIG. 10 is a block diagram of an optical fiber amplifying apparatus, which is a fourth preferred embodiment of the invention.

Referring to FIG. 10, in an optical fiber amplifying apparatus, which is a fourth preferred embodiment of the invention, wavelength-multiplex signal lights are branched on the input side and the output side of the EDF module 5, and signal lights of the same wavelength are extracted. The control circuit 19 computes the gains from the input level and the output level of the signal lights of that wavelength, and so controls the Peltier element 7 as to keep the gains at a prescribed value. The optical fiber amplifier of FIG. 10 is provided with an optical branching device 26 for branching part of the wavelength-multiplex signal lights to the signal light input side of the optical isolator 1a. To the branching port of the optical branching device 26 is connected the channel monitor 27. The channel monitor 27 extracts signal lights of a specific wavelength out of the branched wavelength-multiplex signal lights, detects the output level of the signal lights, and delivers it to the control circuit 19 as the monitoring signal. This optical fiber amplifier is also provided on its output side with another optical branching device 17 and channel monitor 18. The channel monitor 18 delivers to the control circuit 19 the level of signal lights of the same wavelength as that of the signal lights extracted by the channel monitor 27. The control circuit 19 calculates the gains on the basis of the received input signal light level and output signal light level. The control circuit 19 so controls the Peltier element 7 as to keep the calculated gains at a prescribed value.

Figure 11:
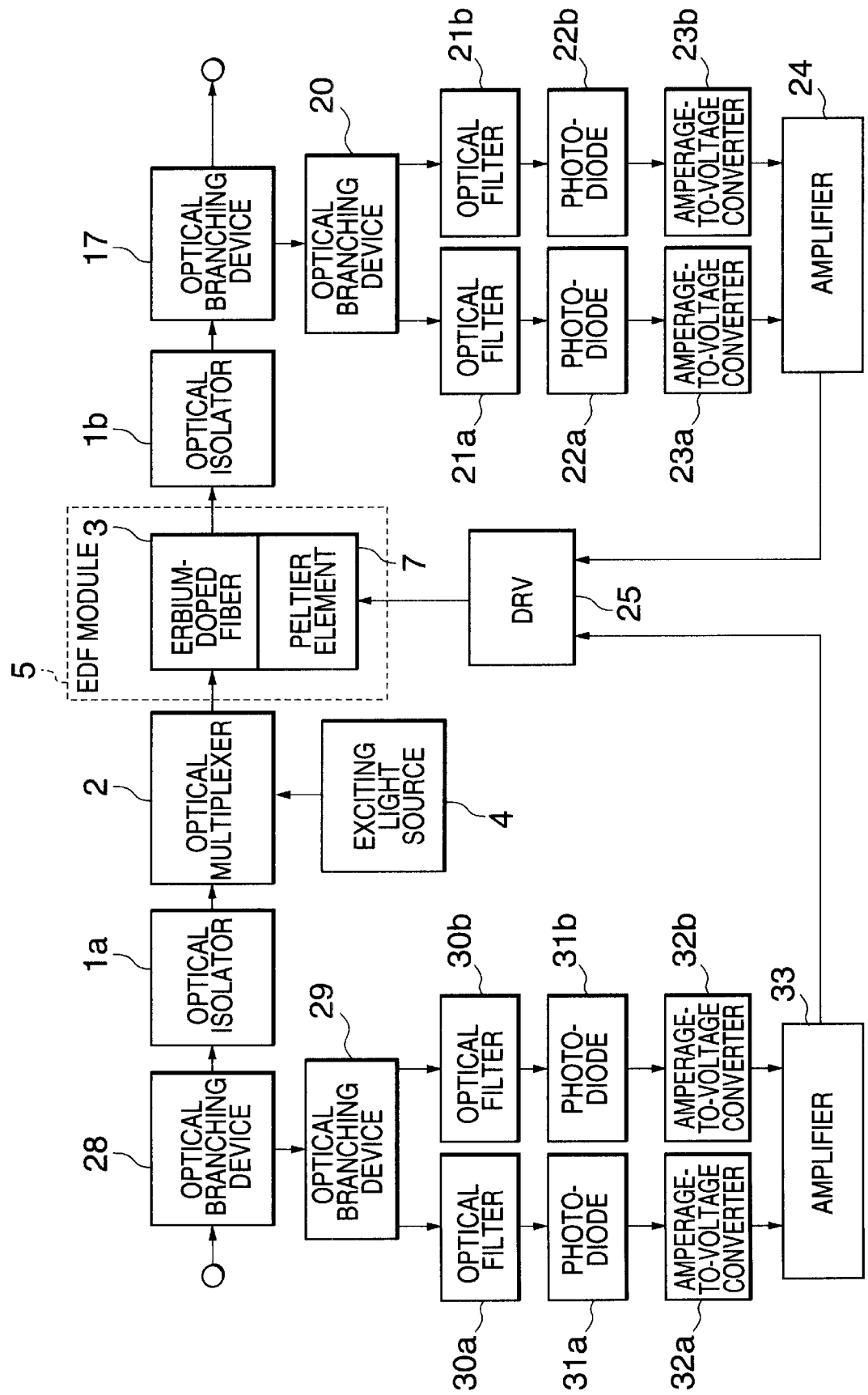
FIG. 11 is a block diagram of an optical fiber amplifying apparatus, which is a fifth preferred embodiment of the invention.

Referring to FIG. 11, in an optical fiber amplifying apparatus, which is a fifth preferred embodiment of the invention, like the fourth embodiment, a plurality of signal lights among the wavelength-multiplex signal lights are monitored, and the gains of signal lights are computed to control the temperature of the Peltier element 7. The optical fiber amplifying apparatus of FIG. 11 is provided on the signal light input side of the optical isolator la with an optical branching device 28 for branching part of the wavelength-multiplex signal lights. To the branching port of the optical branching device 28 is connected an optical branching device 29. The optical branching device 29 further branches the branched wavelength-multiplex signal lights into two. Optical filters 30a and 30b selectively extract only signal lights out of the two branched lights. Photodiodes 31a and 31b and amperage-to-voltage converters 32a and 32b convert the levels of the two signal lights into voltages. An amplifier 33 amplifies the voltages, and delivers them to the driver circuit 25. The optical fiber amplifying apparatus in this example is provided on the output side of the EDF module 5 with the configuration illustrated in FIG. 9. Therefore, the driver circuit 25 receives voltage signals indicating the output levels of signal lights from the output side, and computes the gains from the input/output levels of the signal lights. The driver circuit 25 so controls the Peltier element 7 as to keep the gains of the signal lights within a prescribed range (e.g. within 1 dB). While this example is an instance in which wavelength-multiplex signal lights contain two signal lights, if more optical filters are added, naturally more signal lights are processed.

Figure 12:
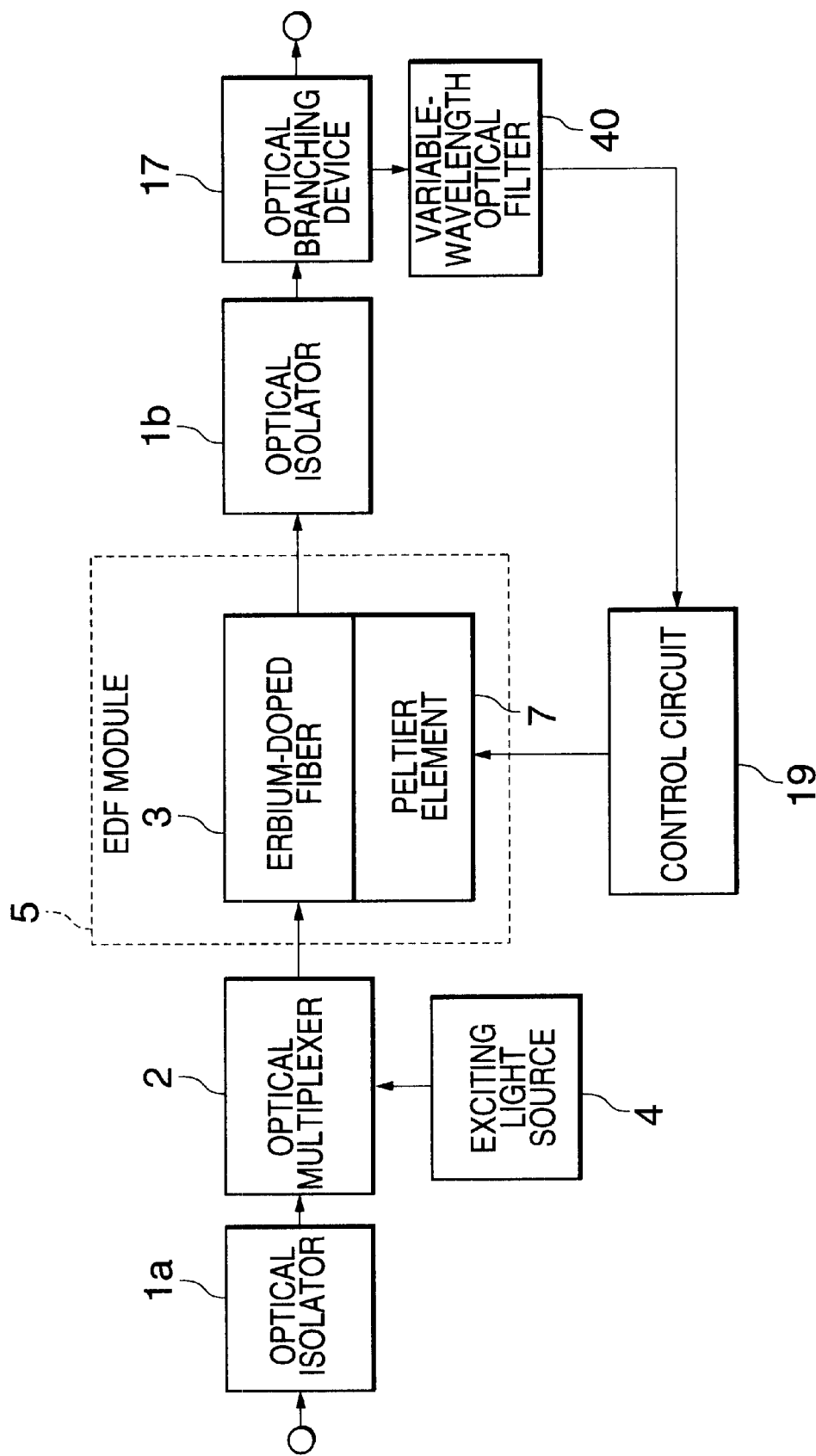
FIG. 12 is a block diagram of an optical fiber amplifying apparatus provided with another optical signal extracting means.
Figure 13:
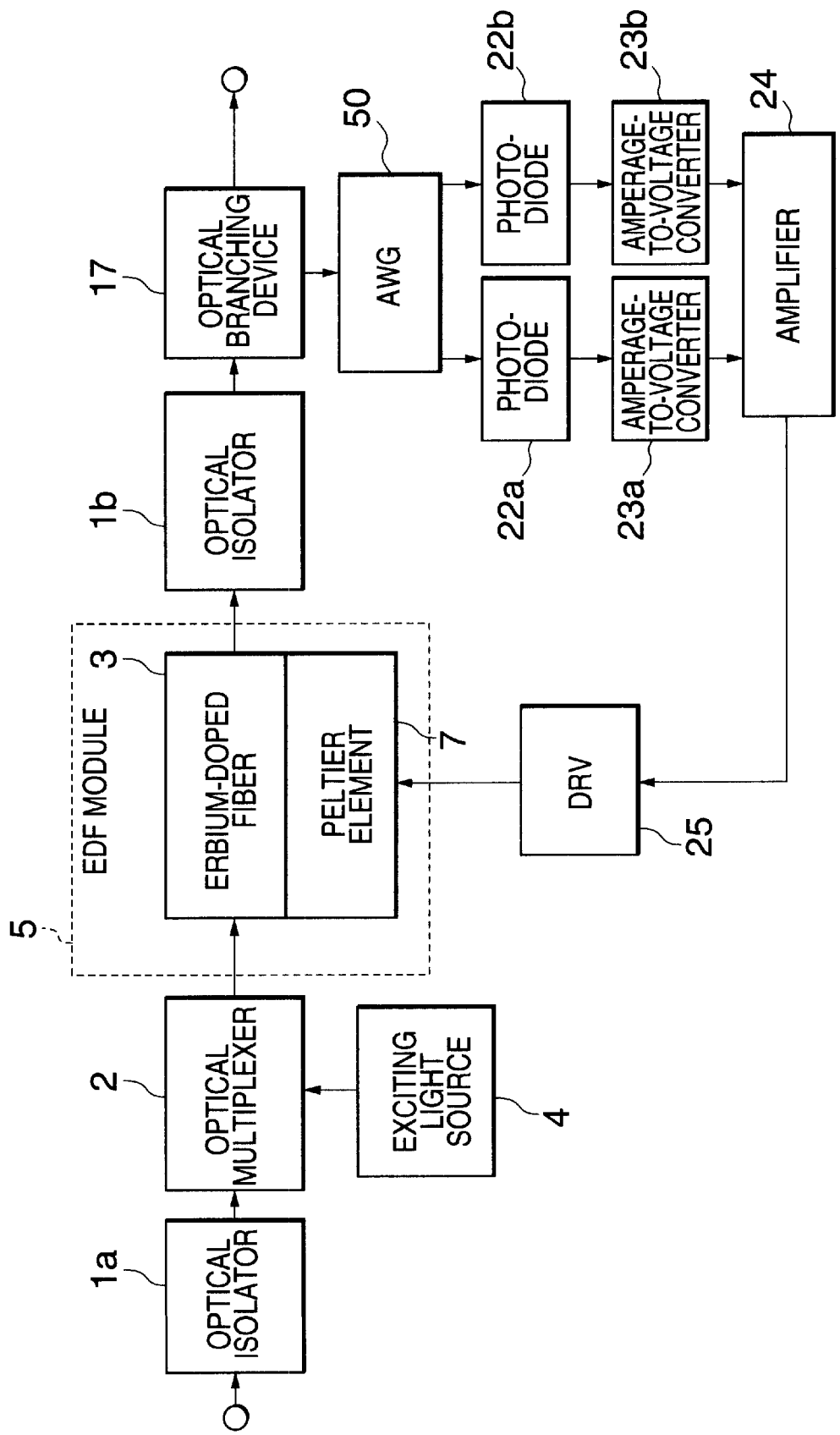
FIG. 13 is a block diagram of an optical fiber amplifying apparatus provided with still another optical signal extracting means.
Figure 14:
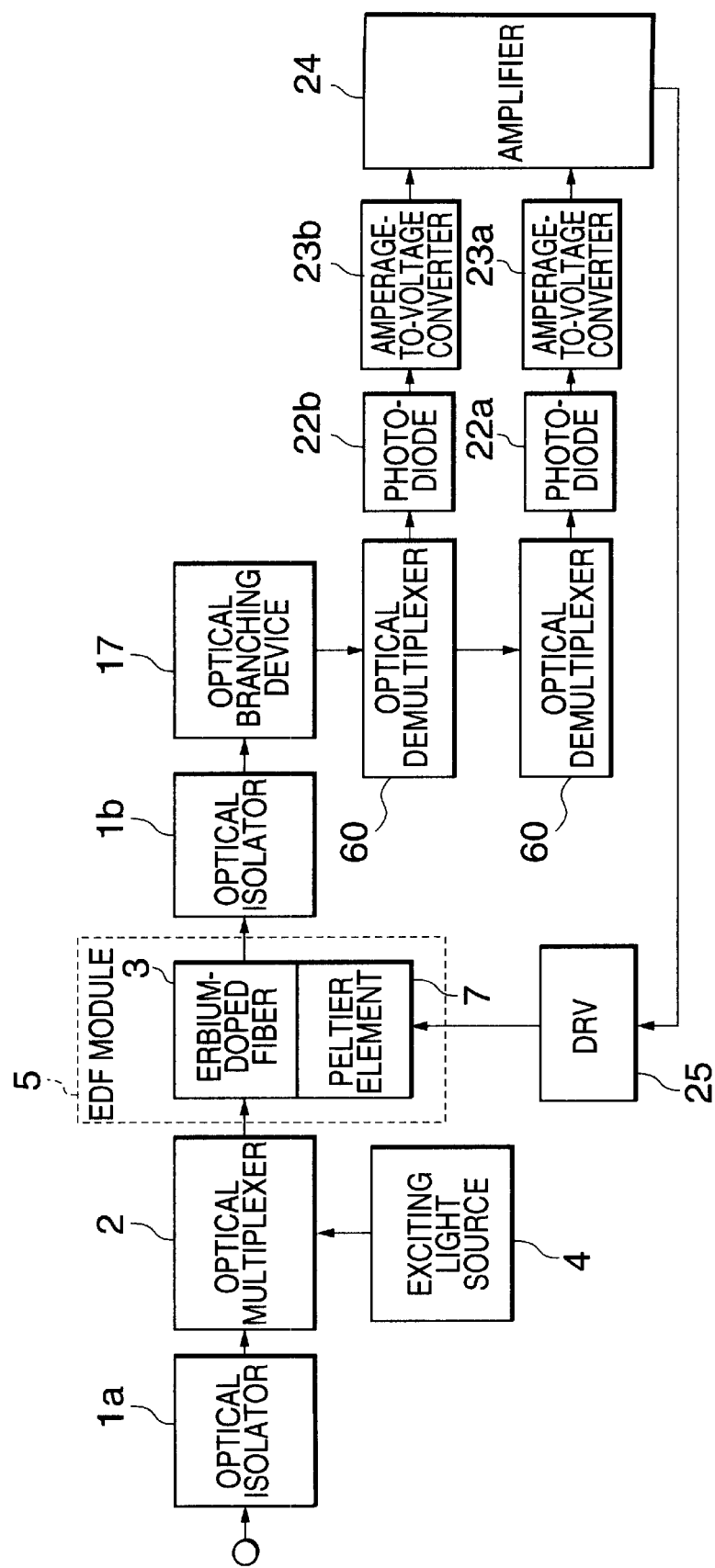
FIG. 14 is a block diagram of an optical fiber amplifying apparatus provided with yet another optical signal extracting means.

For extracting a plurality of signal lights out of wavelength-multiplex signal lights, besides one of the foregoing configuration, another device is available for use as described below. As illustrated in FIG. 12, a variable-wavelength optical filter 40 can successively monitor a signal light of each wavelength (channel) out of wavelength-multiplex signal lights by varying the transmissible wavelength band of the optical filter. For instance, the control circuit 19 can temporarily hold the output level of each of the monitored signal lights in a memory (not shown), and control the Peltier element 7 on the basis of the output level of each signal light. Another signal light extracting means can have, as illustrated in FIG. 13, a first optical branching device for branching wavelength-multiplex signal lights and an optical demultiplexer 50 (e.g. an arrayed waveguide grating (AWG)) for demultiplexing the branched wavelength-multiplex signal lights into individual signal lights. Still another signal light extracting means, as shown in FIG. 14, can have a configuration in which optical demultiplexers 60, each combining a fiber grating reflecting only a specific wavelength and transmitting all other wavelengths and an optical circulator, are connected in cascade. Such wavelength extracting means can be arranged on either the output side or both sides of the EDF module.

Any optical fiber amplifying apparatus according to the present invention can prevent the gain/wavelength characteristic from being varied by fluctuations in ambient temperature. The optical fiber amplifying apparatus, as it extracts signal lights out of wavelength-multiplex signal lights and controls the heating/cooling of the EDF module according to their output levels, can flatten the output level or gains of the signal lights.

While the present invention has been described in terms of certain preferred embodiments thereof, it is to be understood that the subject matter encompassed by the invention is not limited to those specific embodiments. Instead, it is intended to include all such alternatives, modifications and equivalents as can be included within the spirit and scope of the following claims.

What is claimed is:

1. An optical fiber amplifying apparatus for directly amplifying input signal lights, comprising:
    an optical fiber for amplifying input signal lights, and
    a temperature control means for controlling the temperature of the optical fiber, provided with:
        a signal light extracting means for extracting at least one signal light out of wavelength-multiplex signal lights supplied from said optical fiber, and
        a level detecting means for detecting the level(s) of the extracted signal light(s), wherein
    said temperature control means is provided with:
        a heating/cooling element for heating or cooling said optical fiber, and
        a temperature control circuit for controlling the heating/cooling element on the basis of the level(s) of the detected signal light(s),
    said signal light extracting means includes:
        a first optical branching device, arranged on the output side of said optical fiber, for branching said wavelength-multiplex signal lights which have been amplified,
        a second optical branching device for branching the branched wavelength-multiplex signal lights into a plurality of branched lights, and
        an optical filter, arranged on the output side of the second optical branching device, for extracting a signal light of a prescribed wavelength out of each branched light.

2. An optical fiber amplifying apparatus, as claimed in claim 1, wherein
    said temperature control means comprises:
        a temperature sensor for detecting the temperature in the vicinity of said optical fiber, and
        a temperature control circuit for controlling the heating/cooling element on the basis of the output of the temperature sensor.

3. An optical fiber amplifying apparatus, as claimed in claim 2, wherein
    said temperature control means is provided with:
        a bobbin in which said optical fiber is to be installed, and
        said heating/cooling element is arranged in contact with the bobbin.

4. An optical fiber amplifying apparatus, as claimed in claim 3, wherein
    said bobbin has a columnar shape having a flange at each end, and
    said optical fiber is wound around said bobbin between the flanges.

5. An optical fiber amplifying apparatus, as claimed in claim 4, wherein
    said heating/cooling element is arranged to be in contract with at least one of the flanges of said bobbin.

6. An optical fiber amplifying apparatus, as claimed in claim 3, wherein
    said bobbin is in a cylindrical shape having a hollow part, and
    said heating/cooling element is arranged in the hollow part of said bobbin.

7. An optical fiber amplifying apparatus, as claimed in claim 2, wherein
    said temperature control means is provided with a member having a grooved part and an optical fiber is arranged in the grooved part so as to be in close contact with the member, and
    said heating/cooling element is arranged in contact with the member.

8. An optical fiber amplifying apparatus, as claimed in claim 1, wherein
    said temperature control means is provided with:
        a temperature sensor for detecting the temperature in the vicinity of said optical fiber,
        an electroconductive film formed over the surface of said optical fiber,
        a current applying means for flowing an electric current to the electroconductive film, and
        a control circuit for controlling the current applying means on the basis of the output of the temperature sensor.

9. An optical fiber amplifying apparatus, as claimed in claim 8, wherein
    said electroconductive film is a carbon film.

10. An optical fiber amplifying apparatus, as claimed in claim 1, provided with:
    an exciting light source for supplying an exciting light, and
    an optical multiplexer for bringing the exciting light incident on said optical fiber, wherein
        the optical multiplexer is arranged on the signal light input side of said optical fiber, and
        the exciting light comes incident on said optical fiber in the same direction as the traveling direction of the signal light.

11. An optical fiber amplifying apparatus, as claimed in claim 1, provided with:
   an exciting light source for supplying an exciting light, and
   an optical multiplexer for bringing the exciting light incident on said optical fiber, wherein
      the optical multiplexer is arranged on the signal light output side of said optical fiber, and
      the exciting light comes incident on said optical fiber in the reverse direction to the traveling direction of the signal light.

12. An optical fiber amplifying apparatus, as claimed in claim 1, provided with:
   an exciting light source for supplying an exciting light, and
   optical multiplexers for bringing the exciting light incident on said optical fiber, wherein
      the optical multiplexers are arranged on the signal light input side and the signal light output side of said optical fiber, and
      the exciting light comes incident on said optical fiber in two directions.

13. An optical fiber amplifying apparatus, as claimed in claim 1, wherein
   said signal light extracting means detects one signal light out of the wavelength-multiplex signal lights, and
   said temperature control circuit so controls said heating/cooling element as to keep the level of that signal light at a prescribed value.

14. An optical fiber amplifying apparatus, as claimed in claim 1, wherein
   said signal light extracting means extracts a plurality of signal lights differing in wavelength out of the wavelength-multiplex signal lights,
   said level detecting means detects the output levels of the plurality of extracted signal lights, and
   said temperature control circuit so controls said heating/cooling element as to keep the levels of these signal lights within a prescribed range.

15. An optical fiber amplifying apparatus, as claimed in claim 14, wherein
   said plurality of signal lights are all the signal lights contained in the wavelength-multiplex signal lights.

16. An optical fiber amplifying apparatus, as claimed in claim 1, further provided with:
   signal light extracting means, arranged on the input side of said optical fiber, for extracting at least one signal light out of the inputted wavelength-multiplex signal lights, and
   a level detecting means for detecting the level(s) of the signal light(s) extracted from the signal light extracting means, wherein
      the two signal light extracting means extract signal lights of the same wavelength, and
      said temperature control circuit controls the heating/cooling element on the basis of the input levels and the output levels of the extracted signal lights of the same wavelength.

17. An optical fiber amplifying apparatus, as claimed in claim 16, wherein
   the two signal light extracting means extract one signal light each of the same wavelength, and
   said temperature control circuit computes the gain of the signal light on the basis of said two levels of the signal lights and so controls the heating/cooling element as to keep the gain at a prescribed value.

18. An optical fiber amplifying apparatus, as claimed in claim 16, wherein
   the two signal light extracting means extract a plurality of signal light of the same wavelength, and,
   said temperature control circuit computes the gains of the signal lights on the basis of said two levels of the signal lights of the same wavelength and so controls said heating/cooling element as to keep these gains within a prescribed range.

19. An optical fiber amplifying apparatus, as claimed in claim 1, wherein
   said temperature control means is provided with a bobbin around which said optical fiber is wound, and
   said heating/cooling element is arranged in contact with the bobbin.

20. An optical fiber amplifying apparatus, as claimed in claim 19, wherein
   said bobbin has a columnar shape having a flange at each end, and
   said optical fiber is wound around said bobbin between the flanges.

21. An optical fiber amplifying apparatus, as claimed in claim 20, wherein
   said heating/cooling element is arranged to be in contact with at least one of the flanges of said bobbin.

22. An optical fiber amplifying apparatus, as claimed in claim 19, wherein
   said bobbin is in a cylindrical shape having a hollow part, and
   said heating/cooling element is arranged in the hollow part of said bobbin.

23. An optical fiber amplifying apparatus, as claimed in claim 1, wherein
   said temperature control means is provided with a member having a grooved part and an optical fiber is arranged in the grooved part so as to be in close contact with the member, and
   said heating/cooling element is arranged in contact with the member.

24. An optical fiber amplifying apparatus, as claimed in claim 1, wherein
   said heating/cooling element is provided with:
      an electroconductive film formed over the surface of said optical fiber, and
      a current applying means for flowing an electric current to the electroconductive film, and
      said temperature control circuit controls the current applying means on the basis of the output of the level of the detected signal light.

25. An optical fiber amplifying apparatus, as claimed in claim 24, wherein
   said electroconductive film is a carbon film.

* * * * *